Figure 1:
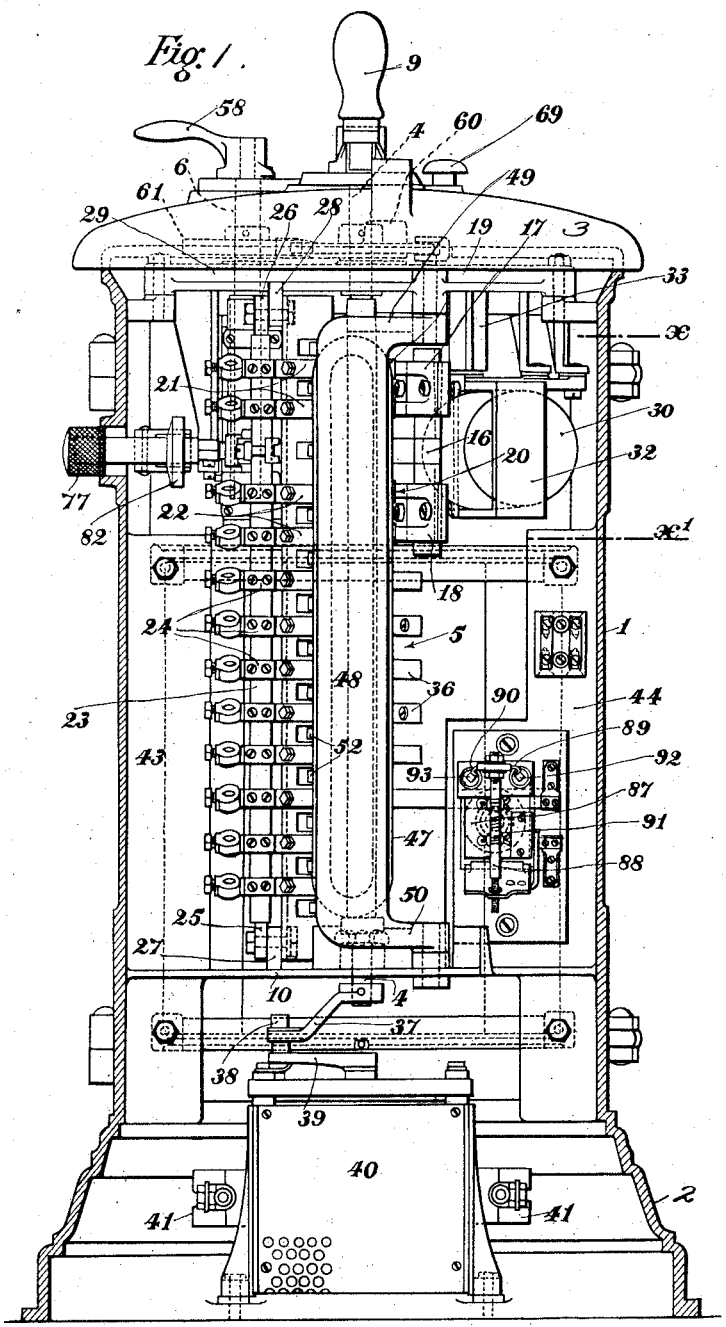

J. R. GARNER & M. R. H. MUELLER.
CONTROLLER FOR ELECTRIC MOTORS.
APPLICATION FILED JUNE 30, 1911.

1,024,984.

Patented Apr. 30, 1912.

6 SHEETS—SHEET 1.

WITNESSES.

INVENTORS Joseph R. Garner
Max R. H. Mueller
by

J. R. GARNER & M. R. H. MUELLER.
CONTROLLER FOR ELECTRIC MOTORS.
APPLICATION FILED JUNE 30, 1911.
1,024,984.
Patented Apr. 30, 1912.
6 SHEETS—SHEET 2.
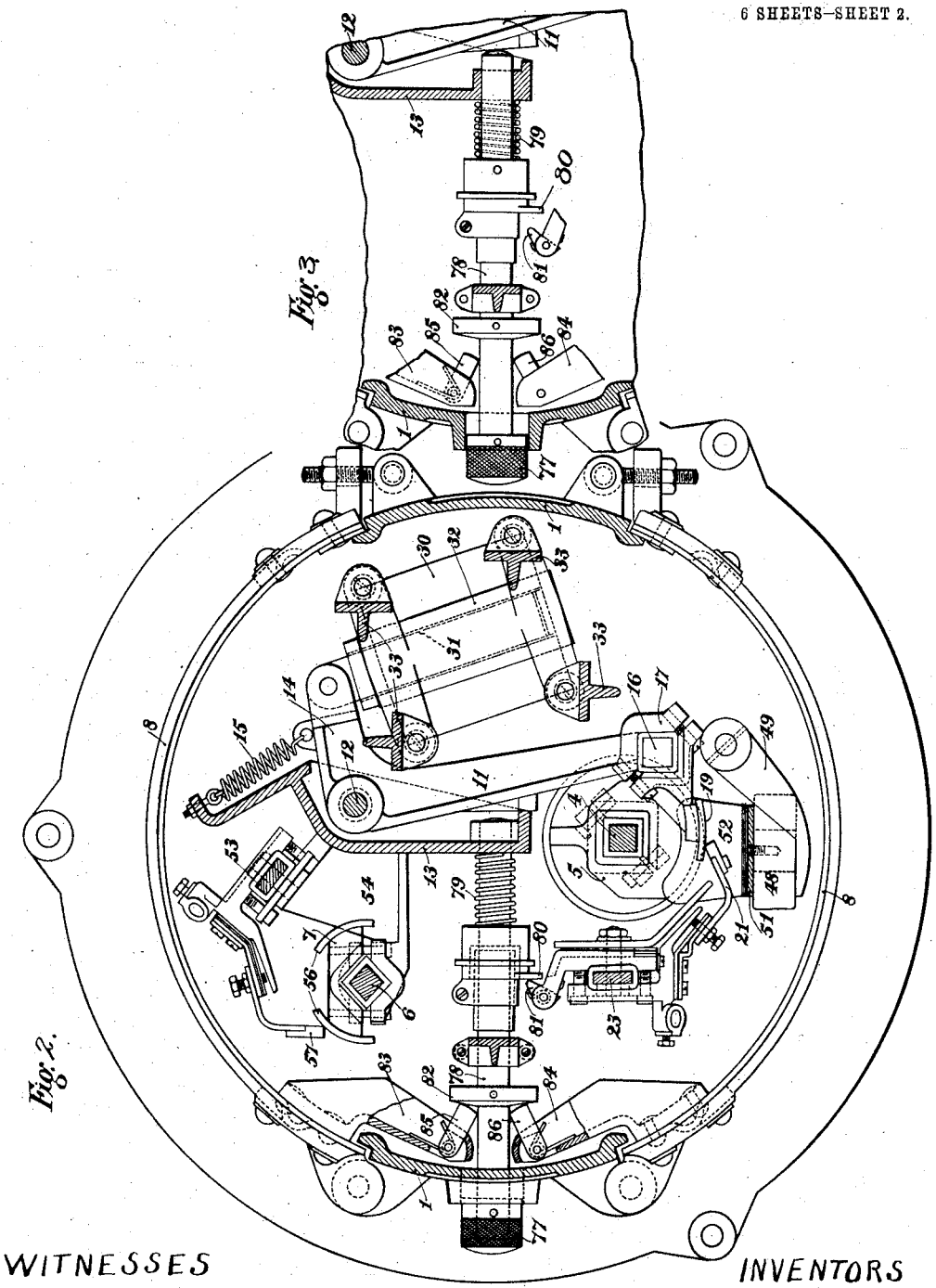
WITNESSES
INVENTORS
Joseph R. Garner
Max R. H. Mueller
by J. R. GARNER & M. R. H. MUELLER.
CONTROLLER FOR ELECTRIC MOTORS.
APPLICATION FILED JUNE 30, 1911.

1,024,984.

Patented Apr. 30, 1912.

6 SHEETS—SHEET 3.

WITNESSES.

INVENTORS Joseph R. Garner
Max R. H. Mueller

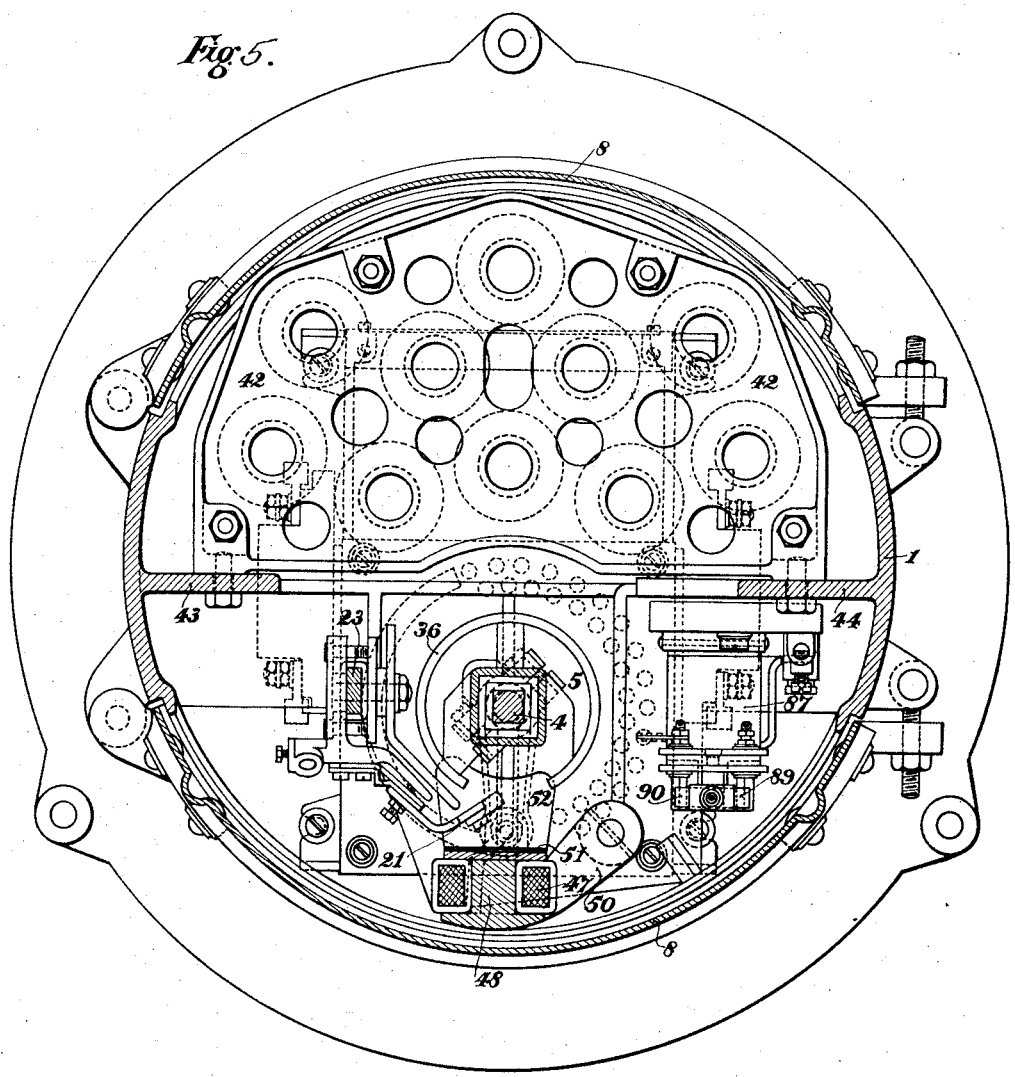

J. R. GARNER & M. R. H. MUELLER.
CONTROLLER FOR ELECTRIC MOTORS.
APPLICATION FILED JUNE 30, 1911.
1,024,984.
Patented Apr. 30, 1912.
6 SHEETS—SHEET 5.
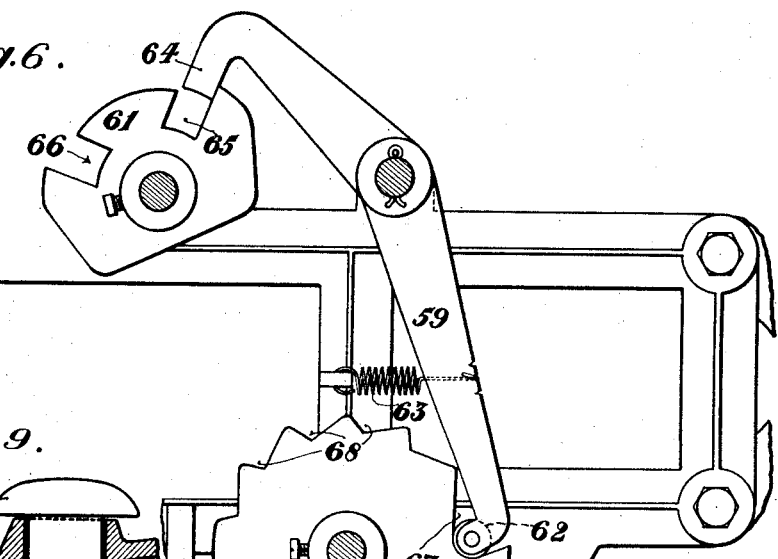
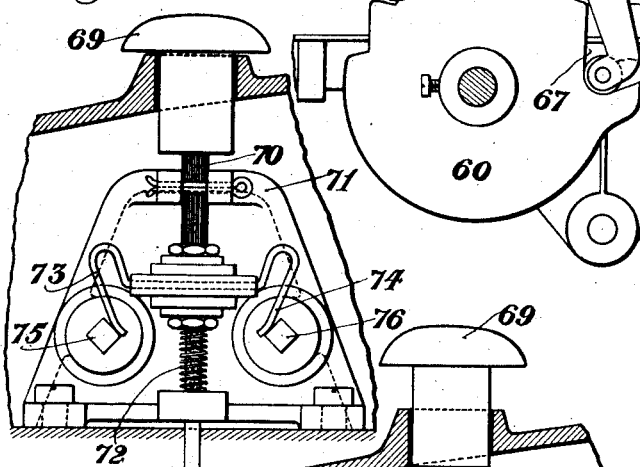
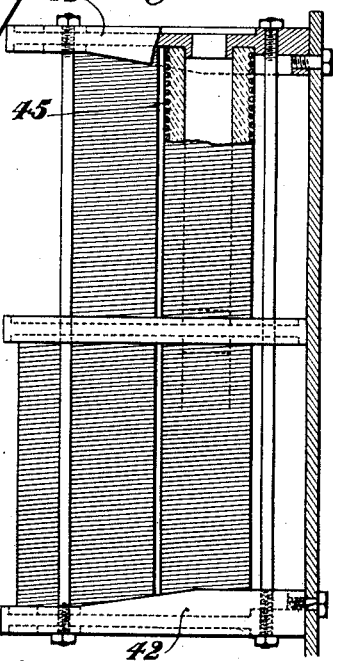
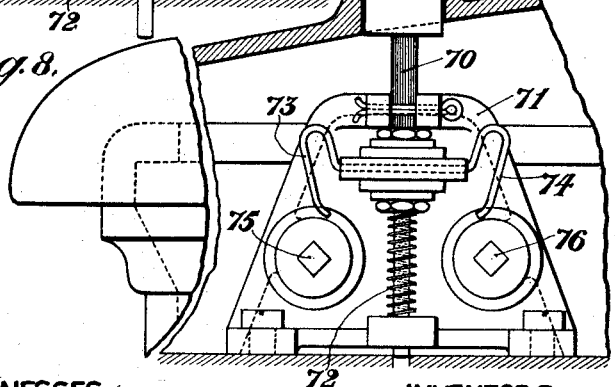
WITNESSES
INVENTORS
J. R. Garner
M. R. H. Mueller

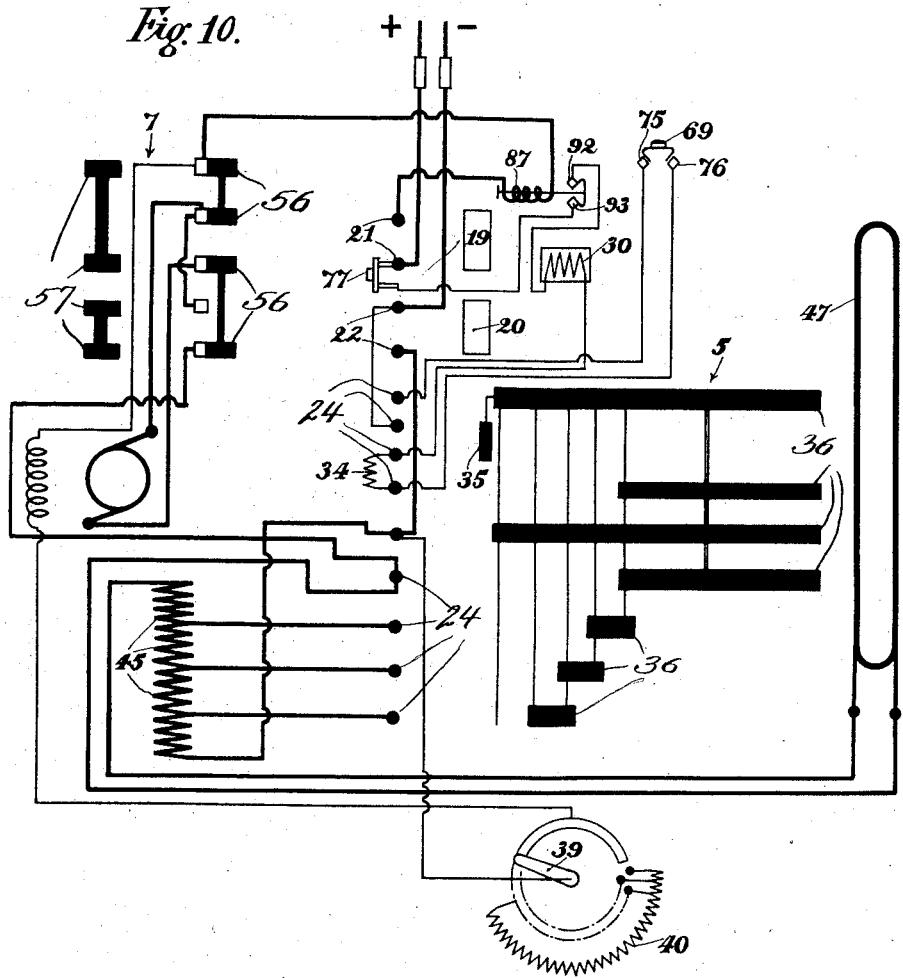

UNITED STATES PATENT OFFICE.

JOSEPH RICHARDSON GARNER AND MAX RICHARD HUGO MUELLER, OF ASTON, BIRMINGHAM, ENGLAND, ASSIGNORS TO ELECTRIC AND ORDNANCE ACCESSORIES COMPANY LIMITED, OF ASTON, ENGLAND, A CORPORATION OF GREAT BRITAIN.

CONTROLLER FOR ELECTRIC MOTORS.

1,024,984.      Specification of Letters Patent.      Patented Apr. 30, 1912.

Application filed June 30, 1911. Serial No. 636,232.

*To all whom it may concern:*

Be it known that we, JOSEPH RICHARDSON GARNER and MAX RICHARD HUGO MUELLER, subjects of the King of Great Britain and the Emperor of Germany, respectively, residing at Aston, Birmingham, England, have invented certain new and useful Improvements in Controllers for Electric Motors, of which the following is a specification.

This invention relates to barrel-type controllers for use in connection with electric motors for driving machinery and for other purposes, and has for its principal object to provide in conjunction with the starter or controller (with or without a separate reversing barrel) an improved construction of magnetically-operated double-pole switch or circuit-breaker.

A further object of the invention is to provide in conjunction with the controller and circuit breaker, various accessory devices or adjuncts which enable the combination appliance to be effectively and safely used in controlling an electro-motor, and which automatically protect both the said motor and the different elements of the control system from the consequences of unskilful or improper usage, as well as for the instantaneous breaking of the main and shunt circuits, both automatically and by hand, in the event of emergency or accident. All these accessory or protective devices are also constructed so as to admit of their being inclosed within the pillar-like casing of the controller, and they comprise an arrangement for electrically interlocking the circuit-breaker with the main controller or series regulating barrel; an emergency release device whereby the shunt circuit of the breaker system can be broken by hand and the magnetically-locked circuit breaker released for breaking the main circuit; an overload release whereby the no-volt locking coil of the circuit breaker is de-energized and the said breaker is permitted to operate for breaking the main circuit in the event of an overload coming on the mains (whether such overload be due to too rapid cutting out of the starting resistances from the armature circuit or otherwise); and a push-button device operated by hand for closing the shunt circuit prior to the actuation of the main starter barrel and arranged so that if the operator should move his hand from the said push-button before the said barrel has been brought to the full-on position, the magnetic lock in the circuit-breaker is broken and the main circuit interrupted. Also when a reversing barrel is combined with the main barrel, a mechanical interlocking gear is provided within the pillar casing for preventing the actuation of the reversing barrel except when the main barrel is in the "off" position.

Further, according to the said invention, the casing wherein the various parts above referred to are inclosed, is provided with large doors which, when opened, admit of ready access being obtained to all the inclosed mechanical and electrical parts and their connections, and these doors are interlocked with the means for breaking the shunt circuit of the controller system so that any attempt to open the doors when the current is on results in the breaking of the said shunt circuit and the consequent release of the main circuit-breaker. And further, the inclosed system also comprises an improved arrangement of electromagnetic blow-out for protecting and isolating the contact fingers of both the main circuit breaker and the main controller barrel.

The features above specified are also present in the construction shown in our companion application Serial No. 636,233, filed of even date, which, however, contains no claims therefor.

Figure 4:
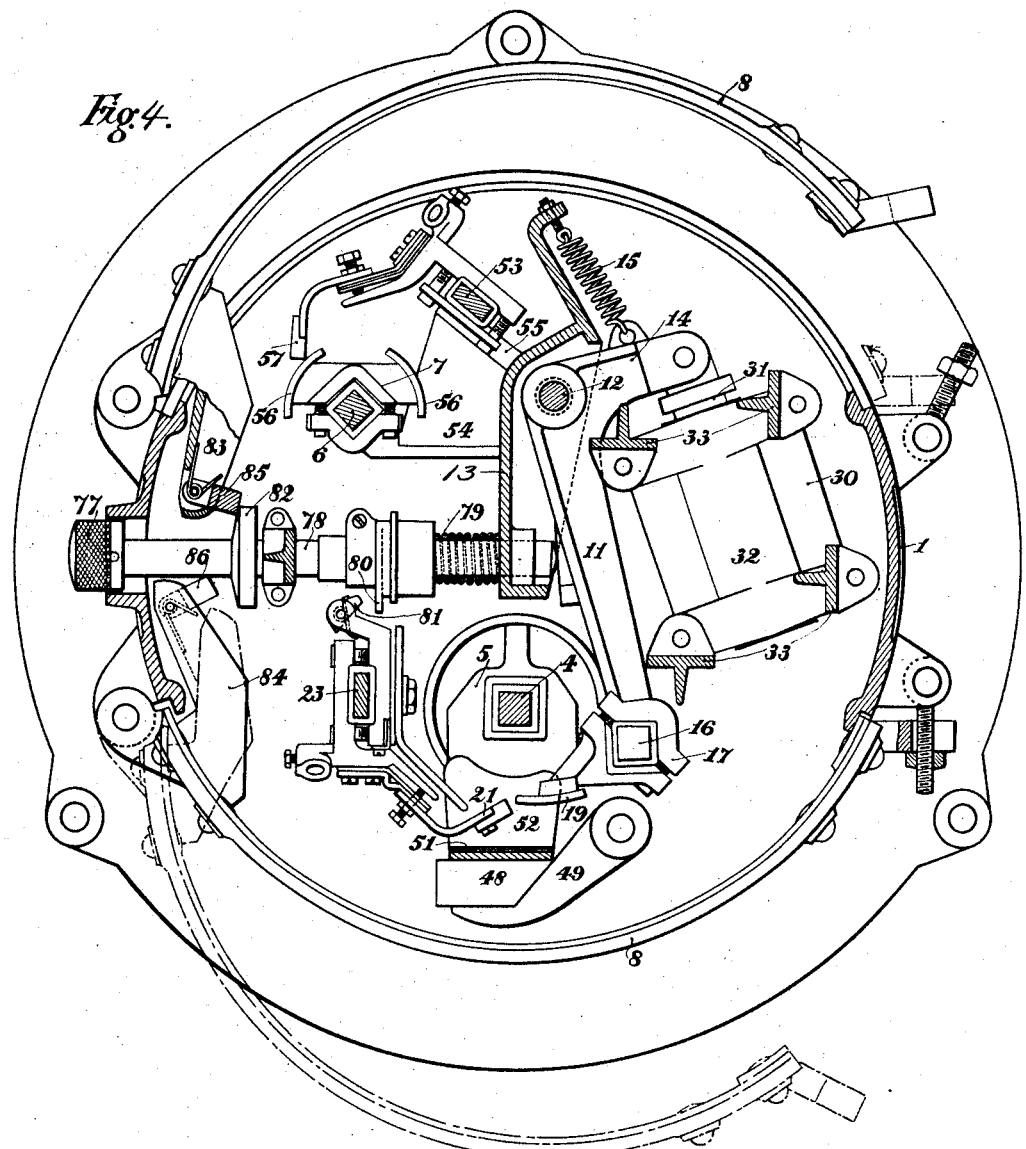

Figure 1 of the accompanying drawings is a vertical section through the casing of a controller appliance constructed and arranged in accordance with this invention, and provided with a reversing barrel, the internal arrangement being shown in elevation. Fig. 2 is a transverse horizontal section through the appliance on line $x$ Fig. 1. This view shows the main switch or circuit breaker in its "on" position, and also represents the emergency device for releasing the circuit-breaker or switch so as to allow of the main circuit being broken. Also there is shown in this view the means for releasing the said switch in the event of the doors of the casing being opened when the current is "on." Fig. 3 shows the emergency release device when pushed in to open the switch. Fig. 4 is a similar view to that represented in Fig. 2, but it illustrates how the opening of one of the doors automatically places the switch or circuit breaker in its "off" position. Fig. 5 is a cross-section on line $x^1$ Fig. 1. Fig. 6 shows the interlocking arrangement for preventing the reversing barrel being turned until the main barrel is in its "off" position. Fig. 7 represents a section through the cage or frame carrying the armature resistance elements. Fig. 8 shows the push-button device for closing the shunt circuit of the controller system while the barrel is being brought to its "full on" position. This view represents the device in its "off" position. Fig. 9 is a similar view, but it represents the device when depressed into its "on" position. Fig. 10 is a diagram of the controller system when a reversing barrel is employed in connection with the main barrel.

The same reference numerals indicate corresponding parts in each of the figures of the drawings.

The pillar-like casing 1 of the controller appliance is of upright cylindrical shape, and has its bottom formed as a base or foot 2, while the top is provided with either a fixed or detachable lid or cover 3 having a bearing for the upper end of the shaft 4 of the main controller-barrel 5, as well as a bearing for the shaft 6 of the independently-operated reversing barrel 7.

The front and back of the pillar have large openings to permit of access being obtained to all the internal mechanism and these openings are fitted with hinged doors 8, 8, forming part of the cylinder and provided with suitable fastenings. The said main barrel shaft 4 is arranged vertically in the middle of the pillar casing, but in front of the vertical center line, and its upper end extends through its bearing in the top cover or lid, and is furnished externally with a handle 9 for rotating the said shaft and thereby operating the main controller barrel 5 (which also controls the closing of the main circuit-breaker) and the shunt regulating device, while the lower end of the shaft has its bearing in a cross-web or diaphragm 10 (Fig. 1) which may be cast solid with the casing, and separates the hollow base or foot 2 of the said casing from the upper part thereof. This base 2 constitutes a chamber to contain the shunt regulator (hereafter described) while the space above the said web or diaphragm 10 forms another and larger chamber for containing the circuit breaker, the main-controller and reversing barrels with their contacts, together with their various accessory parts, and also the armature resistance elements.

The circuit-breaker or main switch is arranged in the upper part of the top compartment, immediately below the lid or cover, and its moving elements are arranged on one side of the main shaft. This breaker is of the double-pole type which is taken into and locked in its circuit-closing position electro-magnetically by a no-volt coil arranged in a shunt circuit which is closed by the initial movement of the main controller barrel away from the "off" position, while the circuit-breaking movement is obtained by a spring.

The switch or breaker consists of a bell-crank lever 11 (Fig. 2) keyed to a vertical rock shaft 12 mounted in bearings carried by an upright hanger bracket 13 situated in the center of the casing behind the main shaft, and the short arm 14 of the said lever is connected to one end of a pull-off spring 15 whose other end is anchored to an extension of the bracket 13, while the longer arm carries a vertical bar 16 upon whose opposite ends are mounted, by means of insulated clips 17, 18, a pair of brushes or contacts 19, 20, which are adapted, by the angular movement of the lever 11, to make contact with and bridge corresponding pairs of spring fingers or terminals 21, 21, and 22, 22, arranged respectively in the positive and negative sides of the main circuit. These fingers are carried upon a vertical finger bar 23 which is suitably arranged in a plane parallel with the main shaft, but upon the side opposite to the lever 11.

The finger-brackets which are mounted on, but insulated from, the said bar, support their respective fingers in front of the main shaft and in such a position that the brushes 19, 20, can make effective contact therewith when the said lever is swung forward into the circuit-closing position. The bar 23 is used to also carry the fingers 24 corresponding to the various brushes or contacts on the main controller-barrel 5, and it is detachably mounted within the pillar-casing by means of eyes 25, 26, at its opposite extremities adapted to be secured by bolts to lugs 27, 28, carried respectively by the cross web 10 in the lower part of the said casing, and by a web or bar 29 arranged across the top of the structure, immediately below the cap or cover 3. This arrangement admits of the whole of the fingers pertaining to the contact breaker and main controller connections being removed bodily from the casing when necessary.

To electro-magnetically operate the circuit-breaker by swinging over the lever 11 to take the contacts or brushes 19, 20, into contact with the fingers 21, 22, a no-volt coil 30, connected up in a shunt circuit, (see diagram Fig. 10) is mounted outside the said lever and its core or plunger 31 is suitably connected with the short arm 14 in such a way that on the said coil being energized (which is effected by arranging for the first motion of the controller-barrel to close the said shunt circuit) the plunger is drawn in and rocks the lever 11 into its main-circuit closing position (as in Fig. 2) in opposition to the pull-off spring 15, while after the said main-circuit has been so closed, the shunt-coil 30 magnetically locks the said lever in its on position until the shunt circuit is again broken or interrupted, whereupon the said spring acts to swing back the lever to the position shown in Fig. 3, and so break the main circuit automatically.

The no-volt coil is mounted in a frame 32 carried by hangers 33 from the transverse web or bar 29 in the top of the structure.

In conjunction with the no-volt coil of the circuit-breaker system there is arranged a reducing resistance 34 (Fig. 10) which is cut out of the shunt circuit by the contact 35, on the controller barrel (at starting) being moved into the preliminary position for first closing the shunt circuit and energizing the no-volt coil. Thus, when the barrel is in this particular position, the shunt voltage in the said coil is at its maximum value, which is sufficient to draw in the plunger 31 and pull over the contact lever 11 for closing the main circuit, but immediately the said barrel is moved past this preliminary position and commences to cut-out the armature resistances the said reducing resistance is placed in series with the no-volt coil and remains in so long as the shunt and main circuits are closed, and it has the effect of cutting down the voltage on the no-volt coil 30 to a value which, although sufficient to maintain the electromagnetic lock and hold on the contact breaker brushes 19, 20, for keeping the main circuit closed, is not sufficient to pull back the plunger 31 and lever 11 if (by the breaking of the shunt circuit from any cause whatever) the no-volt coil should be momentarily or temporarily deënergized and allow the circuit-breaker to be pulled off by its spring. Thus in the event of any interruption of the shunt circuit and consequent breaking of the main circuit by any of the automatic or other protective devices of the system (hereafter described) the stoppage of the motor is made positive and complete, and the circuit cannot be remade except by the operator bringing the barrel right back to the "full-off" position, and then moving the same again to the preliminary position wherein the reducing resistance 34 is cut out and the no-volt coil voltage is of the maximum value necessary for operating the circuit breaker. Thus, for instance, if during starting, an overload should occur and the overload release device operate (as hereinafter described) to break the shunt circuit and the operator should still keep his hand on the starting button (also hereinafter described), the reducing resistance insures that the no-volt coil cannot re-make the main circuit, and compels the operator to take back the controller barrel to the off position and start up afresh.

The main controller-barrel 5 is mounted upon the operating shaft 4, below the main circuit-breaker, and it is furnished with any suitable arrangement of brushes 36, which, by the rotation of the said barrel away from its off position, are carried successively into contact with the corresponding fingers 24 on the finger-bar 23, and thereby progressively cut out the armature resistance from the armature circuit, while after the whole of the said armature resistance has been cut out, the further movement of the shaft with the main barrel is utilized for controlling or altering the resistance in the shunt circuit and thereby increasing or decreasing the speed of the motor. To provide for this regulation the main shaft is extended through its bearing in the lower cross web 10 of the casing and is there furnished with an arm 37 having a forked or slotted extremity adapted to engage with a stud or projection 38 upon the operating lever 39 of a shunt regulator device 40 which may be of any suitable type or construction that can be bolted or otherwise fixed onto the floor or bottom of the hollow base 2 of the pillar-casing. The said shunt-resistance lever is so arranged with respect to the controller barrel that it will move idly without inserting any resistance, during the first part of the motion of the said main barrel when the starting resistances are being cut out, and will then commence to insert the additional speed regulating resistances into the shunt circuit of the motor.

The opposite sides of the shunt-regulator casing may, as shown, be furnished with external brackets 41 to carry the main or series circuit fuses.

The resistance elements pertaining to the armature circuit, and also the reducing resistance 34 of the no-volt coil 30, are both contained within the pillar casing. The armature resistances are in the form of removable and interchangeable coils 45 (see Fig. 7) carried by a frame or cage 42, of suitable form and size, which is arranged in that part of the pillar-casing which is behind the main controller barrel, so that it is fully accessible when the back door 8 of the said casing is opened. This cage structure is secured in position by bolting the same to vertical webs or flanges 43, 44, that are preferably cast solid with the walls of the casing and extend up the opposite sides thereof from the base or foot to the upper part of the case that contains the circuit breaker mechanism. This affords a rigid attachment for a cage of sufficient size to contain the maximum number of interchangeable resistance units 45, while the cage itself can also be unbolted from the carrier-webs and removed through the back door-way or opening when required.

The reducing resistance 34 of the no-volt coil may be of the tubular coil type and can be bolted in an upright position to one of the vertical webs or flanges 43, 44, or be secured in any other convenient part of the casing.

In conjunction with the main controller barrel and circuit-breaker, an electro-magnetic blow-out arrangement is employed, in which a single long magnet coil is used to provide a spark preventing magnetic field that contains the whole of the contact fingers pertaining to the various connections of both the main-barrel and circuit-breaker. For this purpose a blow-out coil 47 of a length equal to that of the finger-bar 23 has its core formed solid with a long foundation bar 48 which is supported in front of, and parallel with, the main-barrel and operating shaft 4, and its upper and lower ends are cranked horizontally into arms 49, 50, thus forming an elongated U-frame. The arms 49, 50, are pivotally mounted in the upper and lower parts of the casing; the arm 49 at the top end being fulcrumed to the cross member 29, while the bottom arm 50 is similarly fulcrumed to the cross web 10. This arrangement enables the blow-out coil to be swung aside after the front door of the casing has been opened, so as to admit of access being obtained to the whole of the fingers and connections of the controller. The pivoted arms of the blow-out coil frame, the cross members to which they are fulcrumed, and the main shaft which has its bearings in the said members, are arranged so that they are electrically connected with one another but effectively insulated from the various brushes and fingers of the barrel, while the blow-out coil or winding 47 is connected in series circuit with the armature resistances, and thus a magnetic blow-out field is induced over the whole of the area containing the contacting elements of the main-barrel and circuit-breaker.

To isolate each contacting pair of fingers and brushes from one another, the inner face of the core 48 has attached to it a strip of suitable refractory material 51, to which is secured a series of horizontally-arranged partition pieces 52, also of refractory material, which, when the blow-out device is in its normal position respectively extend between or are interposed between the succession of fingers 21, 22, 24 on the bar 23 and so form, within the magnetic blow-out field, a succession of isolated compartments wherein the various connections of the shunt and main circuits are made and broken by the actuation of the circuit-breaker and main controller barrel.

The separately-operated reversing barrel 7 is arranged in the back of the upper part of the pillar-casing, and its operating shaft 6 and finger-bar 53 are carried in a separate housing formed (see Fig. 4) by secondary-brackets or webs 54, 55, extending from the upright middle bracket 13. The said reversing barrel is furnished with the usual system of brushes or contacts 56 coöperating with fingers 57 on the bar 53 for reversing the direction of the flow of the main current through the motor armature, and its shaft 6 extends upwardly through the top cover or cap of the casing and is furnished externally with a suitable operating handle 58.

To prevent the reversing barrel from being moved except when the main barrel is in the off position, a mechanical interlocking arrangement is provided between the two barrels. This is arranged in the upper part of the casing, immediately below the top cover, and it comprises (see Fig. 6) an interlocking lever 59 and a pair of disks 60, 61, respectively keyed to the two barrel-shafts, and arranged in the same plane as the lever.

The free end of one arm of the lever carries a roller 62 which is normally held in locking engagement with the main-barrel disk 60 by the pull of a spring 63, while the free end of the other arm has an inturned stop 64 presented to the periphery of the reversing barrel disk 61. The latter disk is formed with two gaps or recesses 65, 66, corresponding to the two positions of the barrel, while the main-barrel disk 60 is formed with a gap or recess 67, and a series of notches 68 corresponding to the various positions of the barrel, and of less depth than the gap 67.

When the main barrel is in the "off" position the rollered end of the lever engages in the gap 67 in the disk 60 and takes its stop end 64 out of engagement with the gap 65 or 66 in the disk 61 of the reversing barrel, so allowing of the latter being turned, but if the said main barrel is in any other position the lever end 64 will be taken into engagement with the gap 65 or 66 and thus lock the reversing barrel against movement.

Mounted upon the top of the pillar casing is the press-button 69 of a starting switch which must be held closed by hand during the operation of the main barrel until the "full-on" position is reached. This switch is adapted to close and break the shunt circuit in which the no-volt coil is situated and it has to be closed by the operator depressing the button with one hand before the first motion is given to the starting handle; otherwise, the shunt circuit being open, the no-volt coil cannot be energized for pulling on the main circuit closer, and should the operator's hand be removed at any time when the barrel is on any resistance step, or before the armature current is full-on, the shunt is automatically broken and the motor consequently stopped. The switch consists (see Figs. 8 and 9) of a slide 70, working by the depression of the button in a bracket 71 in opposition to a suitably applied spring 72 and having spring fingers 73, 74, which, when the button is depressed, engage with a pair of terminals 75, 76, mounted inside the casing and connected up in the shunt circuit as shown in the diagrams. The push-button prevents the starting resistances being kept in circuit, but when the controller barrel reaches its "full-on" position it is short circuited or cut out by means of contacts on the controller barrel.

In connection with the main circuit-breaker is an emergency knob 77 (Figs. 2 to 4) which can be used both to break the circuit breaker interlocking circuit and mechanically push off the circuit breaker lever 11 independently of any movement of the controller-barrel or its handle, so that in the event of a mishap or failure in the main controller, the motor can be instantly brought to a stop. The arrangement for effecting this consists of a plunger or slide 78 which is arranged horizontally in the same plane as lever 11 of the circuit-breaker, and has the one end extending to the outside of the casing where it is furnished with the knob or push button 77 while the other and inner end works through a guide hole in the upright middle bracket 13 and is arranged so that it can impinge against the said contact breaker lever 11 and push the same into its off position on the slide being moved smartly inward. This said slide 78 is influenced by a coiled spring 79 which normally holds the same clear of the lever 11, and further, it carries an insulated conducting collar 80 which is connected up in the shunt circuit and forms one element of an emergency switch, whose other element consists of a spring positioned contact piece 81 mounted upon an adjacent part of the main finger-bar 23 and also connected up in the shunt circuit in series with the no-volt coil of the circuit-breaker. Normally the spring 79 of the slide keeps the collar 80 bearing against the spring finger 81 and so makes the shunt circuit at this point, but if the said slide 78 should be forced inward, these contacts are separated, and the shunt circuit is broken so as to deënergize the no-volt coil, at the same time that the inner end of the slide is forced against the circuit-breaker lever 11, the latter being thereby positively forced to the off position should the pull-off spring 15 fail to act immediately.

The electrical interlock for the doors of the casing is also obtained by the aid of the emergency slide 78 for which purpose the said slide is furnished with an additional collar 82, while the hinge sides of the two doors 8, 8, are both furnished with levering extensions 83, 84, disposed in the plane of the collar 82, and provided with yielding or spring-positioned catch pieces 85, 86, which engage with the said side collar 82 so that when either of the doors is subsequently opened, its lever extension will act, through the catch-piece 85, 86, upon the collar and so give an inward movement to the slide, and thereby separate the contacts 80, 81, of the emergency switch. Thus, if the door should be opened while the current is on the mains, the shunt-circuit is automatically broken and the motor brought to a standstill, while the shunt circuit cannot be re-made to admit of the re-starting of the motor until the door has been fully closed so as to admit of the two elements 80, 81, of the emergency switch coming again into contact.

An adjustable overload release device 87, acting to break the shunt circuit and remove the magnetic lock on the circuit-breaker, is mounted on the front of the vertical web 44 of the casing (see Fig. 1), where it is readily accessible for the purpose of inspection or adjustment when the front door is opened. The winding of this device is, as usual, in series with the mains, and its plunger 88 carries, at its upper end, spring contact fingers 89, 90, normally maintained by the spring 91, in engagement with contact terminals 92, 93, situated in the no-volt coil shunt circuit (see Fig. 10). When, however, an overload occurs the core is raised and the fingers 89, 90, disengaged from the terminals 92, 93, so breaking the shunt circuit and releasing the main switch or circuit breaker.

Referring to the diagram in Fig. 10, when the main switch is closed, the contacts 19, 20, bridge the pairs of fingers 21 and 22, and the current flows from the positive terminal through contact 19, overload coil 87, and the top pair of the right-hand contacts 56 on the reversing barrel 7 to the motor, thence to the bottom pair of contacts 56 on said barrel, and through blow-out coil 47. From there the current flows through the armature resistance 45, and through contact 20 to the negative terminal. When the controller barrel is rotated, the armature resistance 45 is cut in or out as required by the lower contacts 36 on the barrel, in the known manner. On an overload occurring, the coil 87 raises its plunger, which carries a contact piece at its outer end, so as to break contact between the terminals 92, 93, in the shunt circuit in which the no-volt coil 30 is situated. When this happens, the main switch is released, as previously described. In the preliminary position of the barrel, this shunt current passes from the coil 30 through contact 35 to top finger 22 and thus to the negative terminal, the shunt voltage being at its maximum value, which is sufficient to close the main switch, but when the barrel is moved past this preliminary position the reducing resistance 34 is put in circuit, the current passing thence through terminal 76, press-button 69, terminal 75, through the barrel contacts 36 to fingers 24. The motor field shunt circuit is from the top finger 56 of the reversing barrel 7, through the field winding to the shunt regulator 40, leaving by the arm 39, and thence joining the main circuit. As previously described, during the movement of the barrel, arm 39 does not put any resistance into the shunt circuit until all the armature resistance 45 is cut out, but then gradually introduces resistance to vary the speed of the motor. Also, after the armature resistance has been cut out the push-button 69 is short-circuited by a contact on the barrel. When the reversing barrel is rotated the left-hand set of contacts engage with the fingers 57 and cause the current to pass through the motor in the opposite direction.

Having fully described our invention, what we desire to claim and secure by Letters Patent is:—

1. In an electric motor controller, a main circuit, a controller barrel, a main switch comprising a spring-controlled bell-crank lever movable in a plane perpendicular to the barrel shaft and having one arm provided with a contact segment adapted to engage terminals in the main circuit, a no-volt coil connected in shunt with the main circuit and provided with a core which is connected with the other arm of the switch lever, and means upon the controller barrel for closing the shunt circuit on the initial movement of the handle so as to energize the no-volt coil in order to take the switch into its "on" position.

2. In an electric motor controller, the combination, with a main circuit and a main switch, of a controller barrel, a no-volt coil connected in shunt with the main circuit, means for closing the shunt circuit upon the initial movement of the controller barrel so as to energize the no-volt coil for taking the switch into its "on" position, and a reducing resistance which is cut out by the controller barrel when the latter is moved into its initial position for closing the shunt circuit, but which is introduced into the said circuit when the barrel is turned past its initial position so as to reduce the voltage and thereby prevent the switch from being actuated and the main circuit remade, in the event of the latter being broken due to the deënergizing of the no-volt coil, except by moving the barrel to the "off" position.

3. In an electric motor controller, the combination with a controller barrel, of a main switch having contacts which engage with fingers arranged in line with the fingers of the barrel, and an electro-magnetic blow-out consisting of a single electro-magnet arranged in front of the contacts of both the main controller barrel and of the main switch, so as to produce a spark-preventing magnetic field that contains the whole of the said contacts.

4. In an electric motor controller, the combination with a controller barrel, of an electro-magnetically operated main switch having contacts which engage with fingers arranged in line with the fingers of the barrel, and an electro-magnetic blow-out consisting of a single electro-magnet arranged in front of the contacts of both the main controller barrel and of the main switch, so as to produce a spark-preventing magnetic field that contains the whole of the said contacts, said blow-out magnet being pivotally mounted so that it can be swung aside to admit of access being obtained to the contacts and connections.

5. In an electric motor controller, the combination with a controller barrel, of a main switch, a no-volt coil for operating said switch, and an electro-magnetic blow-out consisting of a single electro-magnet arranged in front of the contacts of both the barrel and the main switch, and provided upon its inner face with a strip of refractory material carrying a series of partition pieces which extend between each pair of adjacent contact fingers.

6. In an electric motor controller, the combination with a main circuit and a main switch, of a controller barrel, a no-volt coil connected in shunt with the main circuit for electro-magnetically operating the said switch, and a self-opening push-button switch in the shunt circuit for maintaining the latter closed while the controller barrel is being turned into its "full-on" position.

7. In an electric motor controller, the combination with a main circuit and a main switch, of a controller barrel, a no-volt coil connected in shunt with the main circuit for electro-magnetically operating the said switch, a self-opening push-button switch in the shunt circuit for maintaining the latter closed while the controller barrel is being turned into its "full-on" position, and contacts on the controller barrel for short-circuiting the push-button switch when the said barrel is moved into its "full-on" position.

8. In an electric motor controller, the combination with a main circuit and a main switch, of a controller barrel, a no-volt coil connected in shunt with the main circuit for electro-magnetically operating the said switch, and an emergency release for breaking the shunt circuit of the controller system comprising a spring-controlled slide carrying a contact which normally engages with a fixed contact so as to complete the shunt circuit, and adapted, when pressed inward, to break said circuit and also to mechanically push off the contact lever of the main switch and open the main circuit.

9. In an electric motor controller, the combination with a controller barrel, of a main circuit, a main switch, and a casing inclosing said barrel and switch and having hinged doors which, when opened, automatically break the main circuit should the latter be closed.

10. In an electric motor controller, the combination with a main circuit and a main switch, of a controller barrel, a no-volt coil connected in shunt with the main circuit for electro-magnetically operating the said switch, an emergency release for breaking the shunt circuit of the controller system comprising a spring-controlled slide carrying a contact engaging with a fixed contact to complete the main circuit and adapted when pressed inward to break said circuit and mechanically push off the contact lever of the main switch, a casing inclosing the barrel and main switch and having hinged doors, and an electrical interlocking arrangement for said doors comprising parts upon the hinge ends of the doors adapted, when the latter are opened, to engage with the slide of the emergency device and open the shunt and main circuits should the same be closed.

In testimony whereof we have hereunto set our hands in presence of two subscribing witnesses.

JOSEPH RICHARDSON GARNER.
MAX RICHARD HUGO MUELLER.

Witnesses:
  HENRY NORTON MERRETT,
  WILLIAM STAITES SKERRET.

---

Copies of this patent may be obtained for five cents each, by addressing the "Commissioner of Patents. Washington, D. C."